United States Patent
Vonolfen

(10) Patent No.: US 10,110,822 B2
(45) Date of Patent: Oct. 23, 2018

(54) METHOD FOR TRACKING AT LEAST ONE OBJECT AND METHOD FOR REPLACING AT LEAST ONE OBJECT BY A VIRTUAL OBJECT IN A MOVING IMAGE SIGNAL RECORDED BY A CAMERA

(71) Applicant: Fraunhofer-Gesellschaft zur Förderung der angewandten Forschung e.V., München (DE)

(72) Inventor: Wolfgang Vonolfen, Bonn (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 117 days.

(21) Appl. No.: 15/176,860

(22) Filed: Jun. 8, 2016

(65) Prior Publication Data

US 2016/0366342 A1 Dec. 15, 2016

(30) Foreign Application Priority Data

Jun. 9, 2015 (EP) .................................... 15171207

(51) Int. Cl.
*H04N 5/232* (2006.01)
*H04N 5/14* (2006.01)
(Continued)

(52) U.S. Cl.
CPC .......... *H04N 5/23296* (2013.01); *G06T 7/20* (2013.01); *H04N 5/145* (2013.01); *G06T 2207/30244* (2013.01); *H04N 17/002* (2013.01)

(58) Field of Classification Search
CPC .. H04N 5/23296; H04N 5/145; H04N 17/002; H04N 17/00; H04N 5/232;
(Continued)

(56) References Cited

U.S. PATENT DOCUMENTS 6,141,060 A 10/2000 Honey et al.
6,208,386 B1 * 3/2001 Wilf ...................... H04N 5/2628
348/135
(Continued)

FOREIGN PATENT DOCUMENTS

EP 1209902 A1 5/2002
GB 2502986 A 12/2013
(Continued)

OTHER PUBLICATIONS

"European Application Serial No. 16 173 476.9, Office Action dated Aug. 22, 2017", w/ English Translation, (dated Aug. 22, 2017), 7 pgs.
(Continued)

*Primary Examiner* — Sherrie Hsia
(74) *Attorney, Agent, or Firm* — Schwegman Lundberg & Woessner, P.A.

(57) ABSTRACT

The invention relates to a method for tracking at least one object in a moving image signal recorded by a camera. Firstly, in a calibration step, at least one feature of the object is thereby detected in the moving image recorded by the camera and the position of this feature for different states of the camera, for example different orientations, is stored in an assignment memory. In a tracking step, the position of the object can then be read out, by means of the camera state, from the assignment memory so that a more reliable tracking of the object becomes possible. According to the invention, a method is indicated in addition, in which the object tracked in this way is replaced by a virtual object in the moving image.

17 Claims, 3 Drawing Sheets

Figure 1:
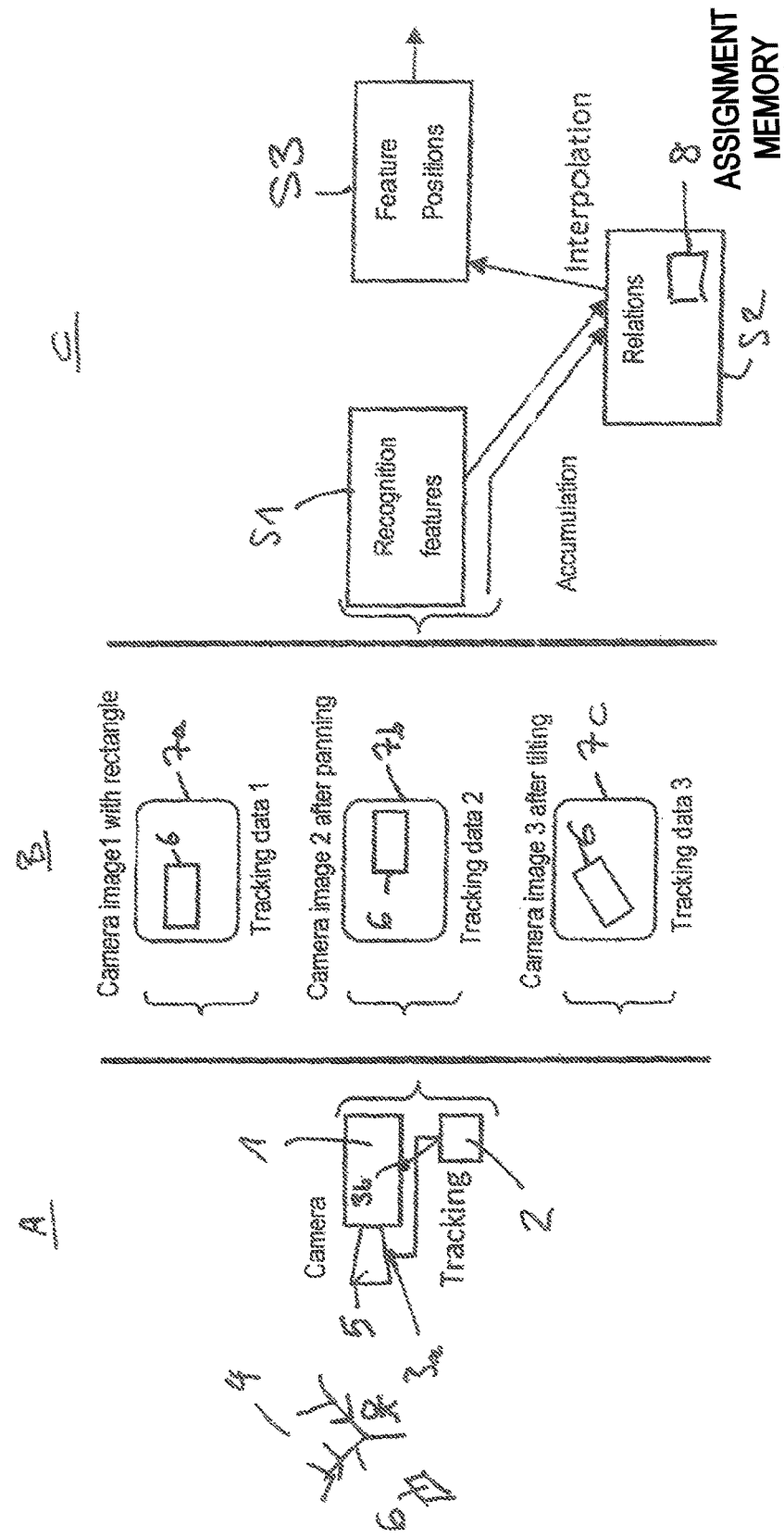

(51) Int. Cl.
*H04N 17/00* (2006.01)
*G06T 7/20* (2017.01)

(58) Field of Classification Search
CPC .. H04N 5/14; G06T 7/20; G06T 7/004; G06T 2207/30244; G06T 7/00
USPC ............. 348/169–172, 208.99, 187; 382/103
See application file for complete search history.

(56) References Cited

U.S. PATENT DOCUMENTS

| | | | |
|---|---|---|---|
| 2011/0216192 A1* | 9/2011 | Leung | H04N 5/225 348/143 |
| 2014/0313405 A1 | 10/2014 | Codd | |
| 2016/0109945 A1* | 4/2016 | Kempinski | G06F 3/013 348/78 |

FOREIGN PATENT DOCUMENTS

| | | |
|---|---|---|
| JP | 2011077780 | 4/2011 |
| WO | WO-97009823 A1 | 3/1997 |
| WO | WO-1997009823 A1 | 3/1997 |
| WO | WO-1997009830 A1 | 3/1997 |
| WO | WO-1998034410 A1 | 8/1998 |
| WO | WO-1998043414 A1 | 10/1998 |
| WO | WO-1999043150 A1 | 8/1999 |
| WO | WO-2012038009 A1 | 3/2012 |
| WO | WO-2013167901 A1 | 11/2013 |
| WO | WO-2013186278 A1 | 12/2013 |
| WO | WO-2014020108 A1 | 2/2014 |

OTHER PUBLICATIONS

"European Application Serial No. 16173476.9, European Search Report dated Oct. 18, 2016", (dated Oct. 18, 2016), 10 pgs.

Chen, Yong-Sheng, et al., "Camera calibration with a motorized zoom lens.", Proceedings. 15th International Conference on Pattern Recognition., (2000), vol. 4. IEEE.

"European Application Serial No. 16 173 476.9, Office Action dated Feb. 8, 2018", w/ English Translation, (dated Feb. 8, 2018), 7 pgs.

* cited by examiner

METHOD FOR TRACKING AT LEAST ONE OBJECT AND METHOD FOR REPLACING AT LEAST ONE OBJECT BY A VIRTUAL OBJECT IN A MOVING IMAGE SIGNAL RECORDED BY A CAMERA

PRIORITY APPLICATIONS

This application claims the benefit of European Patent Application No. 15 171 207.2 filed on Jun. 9, 2015, the whole disclosure of which is incorporated herein by reference.

The invention relates to a method for tracking at least one object in a moving image signal recorded by a camera. Firstly, in a calibration step, at least one feature of the object is thereby detected in the moving image recorded by the camera and the position of this feature for different states of the camera, for example different orientations, is stored in an assignment memory. In a tracking step, the position of the object can then be read out, by means of the camera state, from the assignment memory so that a more reliable tracking of the object becomes possible. According to the invention, a method is indicated in addition, in which the object tracked in this way is replaced by a virtual object in the moving image.

The methods according to the invention and the device according to the invention bridge the gap between sensor-based measuring methods for the camera perspective, which, according to design and equipment, only achieve a certain precision, and the desired aim of placing graphic objects in a camera image pixel-precisely or even sub-pixel-precisely, without the imprecisions of the respective camera tracking system being visible in the mixed image. A particular feature is the independence of the underlying camera tracking system provided that all camera movements can be reconstructed therefrom.

For placing virtual objects in a running video which is based on the recordings of a moving camera, methods are required which calculate the current camera perspective for each video image and transmit it to the graphics computer. For this purpose, generally a model of the actual camera behaviour is developed, which behaviour can be calculated by measurement by fitted sensors or by the camera image itself. With an underlying coordinate system, the model is usually described by parameters for

- the camera position in space: x, y, z. Provided the camera is not mobile, the values are static
- the camera orientation in space: pan, tilt, roll (swivel, inclination, lateral tilting)
- the lens properties: zoom, focus, lens distortion, depth of field
- the camera mounting: nodal point offset (offset of the optical axis relative to the last nodal point), optical centre shift (offset of the optical axis relative to the camera image sensor)

Individual parameter combinations, such as position and orientation, can also be combined, for example in the form of a position matrix. However, this does not change anything with respect to the requirement and the reconstructability of each individual parameter. According to the design of the camera type or the camera stand (pedestal, crane, steadycam, detection of the individual parameters varies. Previous developments therefore differ in the type and combination of sensors for detecting the camera parameters.

In the simplest case, as in the case of US 2014/0313405 A1, incremental sensors are fitted on all mechanical linkages and the values thereof are set in relation to physical dimensions (e.g. sensor steps for angle or distance). Lens properties and also the camera mounting are then measured once and correspondingly taken into account in the recording. Corresponding methods for calculating the camera position from measuring values are known from JP 2011077780 A and EP 1209902 A1.

In WO 98/43414, WO 98/34410, WO 97109830, WO 97109823, a previously known pattern in the scene with its perspective distortion produced in the camera image is used for determining the camera perspective.

In WO 99/43150, an infrared target mounted on the camera is used for detecting the position and orientation of the camera. Detection of the lens properties and of the camera mounting is then effected in the same way as previously.

In WO 2013/167901, a stereo camera mounted on the camera detects real scene features in three-dimensional space in order to determine the position and orientation with respect to the image.

In WO 2014/020108, an additionally mounted wide angle camera detects the real scene two-dimensionally, as a result of which an advance orientation is ensured. The precise calculation is then effected via the image of the recording camera.

In an extension to the so-called hybrid systems, further sensors, such as gyroscopes, acceleration-, gravitation or magnetic field sensors, can ensure assistance with the measurement. Likewise, the camera image itself can be used in order to achieve as precise as possible a placing of graphic objects in the scene.

It is common to all methods that they use a fixed combination of sensors and, if need be, a fine adaptation coordinated thereto is made by means of image processing from the camera image. In WO 2014/020108 and WO 2013/186278 A1, markers are placed explicitly in the scene and then detected in the camera image. According to the design, a different degree of freedom is achieved for the camera and also a different precision for the individual camera parameters. However, it has been shown in practice that, according to the state of the art, a pixel-precise replacement of an object in the camera image by a virtual object is not achieved with the necessary reliability.

It is the object of the present invention to enable tracking of an object and replacement of an object by a virtual object with greater precision.

The object is achieved by the method for tracking at least one object in a moving image signal recorded by a camera according to claim 1, the method for replacing at least one object by at least one virtual object in a moving image signal recorded by a camera according to claim 16 and the image processing device according to claim 17. The dependent claims indicate advantageous developments of the method according to the invention.

According to the invention, a method for tracking at least one object in a moving image signal recorded by a camera is indicated. A moving image signal can be for example a video signal with a large number of temporally successive frames or individual images.

According to the invention, the camera records sections of a scene. It is thereby assumed that the object to be tracked is present at least partially and at least at times in the sections recorded by the camera so that it is detected by the camera. It is not ruled out that the object is at times not present in its entirety in the recorded section. The section recorded by the camera can also comprise only a part of the object. It is also possible that the object is at times not present at all in the section recorded by the camera, for example if the camera pans in a different direction.

The camera produces the moving image signal as image of the recorded sections. The camera therefore films the respective section and produces for example a video signal therefrom as moving image signal.

According to the invention, the camera has at least one sensor with which at least one property of a state of the camera, subsequently termed camera state, can be determined. Preferably, the camera has such a number of sensors that it can be completely determined from the sensor data together with the specifications of the camera how the recorded section of the scene is imaged in the moving image signal. Preferably, sensors are therefore provided with which the camera position in space, for example as X-, Y- and Z coordinates, can be determined. Furthermore, sensors are advantageously provided with which a camera orientation in space can be determined. The camera orientation is normally indicated as pan, tilt and roll, i.e. swivel, inclination and lateral tilting. A sensor can be provided for each of these degrees of freedom. Furthermore, sensors with which lens properties can be determined can advantageously be provided, such as for example a focal length, a zoom, a focus, a lens distortion and/or a depth of field. Furthermore, sensors which measure the camera mounting properties can be provided, for example an offset of the optical axis relative to the last nodal point (nodal point offset) and/or an offset of the optical axis relative to the camera image sensor (optical centre shift).

As a function of the camera mounting used, any combination of the above-cited sensors can be useful. If for example the camera is mounted in a fixed manner and is mounted to swivel only in a single direction and if furthermore the lens properties and the camera mounting are specified in fixed manner, then a single sensor with which said ability to swivel is measured can be sufficient. If, on the other hand, for example the camera is mounted fixed on the ground and the lens unchangeably, but the camera is able to swivel about all three axis, then three sensors are usefully provided for measuring the swivel, inclination and lateral tilting. Any other combinations are possible. If the camera is displaceable in space, sensors for the x-, y- and z position can be useful.

According to the invention, values of at least one property of camera state are determined with the at least one sensor. If therefore the camera is able to swivel for example about one axis, then the property of the camera state here is the orientation of the camera about this axis and the values recorded by the sensor are the angles of this orientation about this axis.

According to the invention, firstly a calibration step is implemented. The aim of the calibration step is to store, in an assignment memory, assignments of values of the observed properties of the camera state at positions of at least one feature of the object in the moving image. The position of the at least one feature of the object can thereby preferably be the position of this feature in the moving image signal recorded by the camera, i.e. for example in a given frame. Preferably, the position is thereby stored in the reference system or coordinate system of the recorded moving image which, in the normal case, is fixed relative to a coordinate system of the camera sensor. Advantageously, the position can hereby comprise both the location of the feature and the orientation and advantageously also the perspective distortion of the feature, provided that the feature has an orientation or a perspective distortion.

According to the invention, positions of at least one feature of the object in the moving image signal are determined for a large number of values of at least one property of the camera state and these positions, together with the corresponding values of the property of the camera state, for which these positions were determined, are stored in an assignment memory. In the assignment memory, advantageously tuples can therefore be stored, which tuples comprise, on the one hand, the position and/or orientation of the feature and, on the other hand, the values of all the sensors which are relevant for the camera state. In the assignment memory, in addition to the values recorded by the sensors which describe the camera state, and the determined positions and/or orientations of the feature, also information which connects the determined positions and/or orientations of the feature with those values of the properties of the camera state in which these positions and/or orientations were determined is therefore stored.

A tracking step can now be implemented in which at least one value of the at least one property of the camera state is determined by means of the at least one sensor and then, from the assignment memory, the position and/or orientation of the at least one feature of the object in the moving image is read out of the assignment memory. That position and/or orientation which is assigned to the values determined by the sensors is thereby read out.

In an advantageous embodiment of the invention, the calibration step can also be implemented further during implementation of the tracking step and in particular can be implemented for further values of the observed properties of the camera state.

In order to make the method according to the invention ready for use as quickly as possible for tracking of objects, it is preferred if, from at least some of the assignments, stored in the assignment memory in the calibration step, of values of the at least one property of the camera state at positions of the at least one feature of the object, further positions of the at least one feature of the object are determined for further values of the at least one property of the camera state, by at least two positions being interpolated and/or extrapolated. In the simplest case, interpolation can be effected for example by a midpoint between two known positions being calculated as interpolated position. The thus calculated position can then be assigned to a value of the property of the camera state which is precisely the mean of those values, in the case of which the two positions were determined, the centre of which was calculated as new position.

In the centre calculation, as described above, the central position is preferably calculated from positions which were determined with values of the property of the camera state and which are situated next to that value at which the new position is intended to be calculated.

Advantageously, the interpolation can also be effected by a constantly differentiable function being set by the already determined pairs of values of the properties and positions of the at least one feature and positions in the case of other values of the property of the camera state being calculated as functional values of this function.

In an advantageous embodiment of the invention, those positions, in the assignment memory, of the at least one feature, which were calculated, for example by means of interpolation or extrapolation, can be marked. If now the camera records an image in a state for which the position of the feature of the object is present only by calculation, then the calibration step can be implemented again in this state and, in the assignment memory, an actually measured position of the feature can be assigned to the corresponding values of the camera properties.

In an advantageous embodiment of the invention, the position, read out in the tracking step, of the at least one feature of the object can be used as start position for a search for the feature of the object in an image processing step. One reason for this can reside in the fact that the camera is situated in a non-fixed base. Under specific circumstances, possible vibrations are not then detected adequately by any of the sensors. In this way, the position of the feature can be determined precisely with respect to the pixels. In this case, the read-out position of the feature is determined advantageously as start position and then, in the image processing step, the feature in the vicinity of the start position is sought. Detection of the feature in the image processing step is possible in many different ways, for example by edge recognition, keying or other pattern detection methods.

Advantageously, the actual position of the feature, determined in the image processing step, can be stored in the assignment memory as that position which is assigned to the value of the property of the camera state to which the position read out in the tracking step was assigned. Therefore, in the assignment memory, the position of the feature used as start position can advantageously be replaced by the more precise position determined in the image processing step.

Advantageously, this replacement can be implemented just when or only when the position read out as start position was a calculated position which was calculated, as described above, for example by interpolation or extrapolation. By means of the advantageous marking of calculated positions in the assignment memory, these can be identified easily.

According to the invention, determination of the position of the at least one feature is implemented for a plurality of values of the at least one property of the camera state. This plurality of values can correspond advantageously to the various sections of the scene. If therefore the camera is panned for example over the scene, then the values of those properties which describe the orientation of the camera are changed, whilst the position of the feature of the object changes along a constant path through the recorded image. Since the path of the feature through the image here is caused by a physical change in the camera state, it can be assumed that the path of the feature through the recorded moving image can constantly be differentiated. It is therefore optionally possible to smooth the determined positions in the assignment memory. Such smoothing can take place for example by a constantly differentiable function being adapted or fitted to the stored positions and then the stored positions being displaced towards the fitted function at the corresponding values of the properties of the camera state. Another advantageous possibility for smoothing resides for example in each position in the assignment memory being replaced by a position averaged from a specific number of surrounding positions. The positions can therefore be replaced for example by a sliding average. The positions taking part in the averaging are thereby preferably a specific number of adjacent positions, on both sides, of the position to be adapted to.

In an advantageous embodiment of the invention, it can be checked in addition whether a position of the feature determined in the calibration step is physically possible. If the feature was determined successfully for several states of the camera, then it can be assumed that the feature, in any other implementation of the calibration step, can occur only at those positions which can be reached physically from the already determined positions. In an advantageous embodiment of the invention, any recognition of the feature can be examined in this respect and any recognition of the feature which does not meet this condition can be rejected as incorrect. If for example the camera is panned over the scene along a specific path, then it can be assumed that the position of the feature follows a constantly differentiable path which is produced by this panning. If the feature was determined successfully several times, then the number of possible paths is therefore restricted by the condition of physical possibilities. If now the feature is detected deviating from a possible path, in one configuration of the calibration step, then it can be rejected as incorrect.

If for example the feature detection is implemented by means of colour keying, then it can occur that the keying colour in the scene occurs for a number of frames also at positions other than those of the feature. Since however these positions cannot be reached normally by the known camera panning from the known positions, this position of the keying colour can be rejected as incorrect.

In an advantageous embodiment of the invention, also the temporal course of feature positions can be taken into account. The camera state adopts different values of its properties temporally in succession. In the recorded moving image, the observed features of the object adopt different positions therefore temporally in succession. Advantageously, from the temporal course of the positions of the at least one feature, further positions can also be extrapolated for previously not adopted values of the camera state. Therefore further positions of the feature of the object can be calculated from the temporal course of the positions.

Advantageously, the temporal course of the positions of the feature of the object can be examined as to whether this course is physically possible. In the case where the course is recognised as physically impossible, those positions which are not physically possible are characterised and/or rejected as incorrect.

In an advantageous embodiment of the invention, the positions of the feature can be displaced such that the temporal course of the positions is smoothed. For example a constantly differentiable function can thereby be adapted to temporally successively recorded positions and the positions can then be displaced towards this constantly differentiable function.

The questionable features of the object can be for example edges of the object, surfaces of the object, and/or regions of the object with a prescribed colour, colour courses, textural patterns, key points, preferably with a high visual salience, features derived from an object vicinity or from methods for optical flow, local descriptors, such as edge sharpness, -strength or -direction or a combination of the previously mentioned features.

Advantageously, the features of the object in the recorded moving image can be determined by means of colour keying, edge recognition or in another way. It is also possible to code the object such that an immediate observer of the scene sees the object, however a camera recognises the coding. Such possibilities are described for example in WO 2012/038009.

If a geometry of the object is known, then conclusions can be drawn advantageously about other features from already recognised features of the object.

Advantageously, the sensors which determine properties of the camera state are mechanical or electromechanical sensors. These can convert a mechanical state of the camera into electrical signals from which the values of the property of the camera state can be determined.

According to the invention, in addition a method for replacing at least one object by at least one virtual object in a moving image recorded by a camera is indicated. The object is thereby tracked in a previously described method. In the described assignment step, a position of the real object in the moving image is then thereby read out by means of the values of properties of the camera state measured by the sensors and, at the thus determined position, the image of the real object is replaced by an image of the virtual object. Advantageously, the replacement can be effected on an individual image basis.

The methods according to the invention for tracking and for replacing objects in moving images recorded by a camera can be used particularly advantageously to replace strips, for example in sport transmissions, by other images or advertising. In this case, the object to be recognised would be the strip. If the position of the strip in the recorded moving image is known, it can therefore be replaced by a different image.

According to the invention, an image processing device is indicated in addition, which device has at least one camera and at least one computing unit and with which the previously described method for tracking at least one object in a moving image signal recorded by the camera and/or the above-described method for replacing at least one object by at least one virtual object can be implemented in a moving image signal recorded by the camera.

The camera image can also be termed image or scene or moving image signal. If an object is mentioned in the text, it emerges from the context whether a real object or a virtual object is thereby of concern. The invention serves inter alia for replacing a real object by a virtual object. All real recognised objects are not thereby necessarily replaced. It is left preferably to the user of the invention whether (possibly linked to conditions) and which real objects are replaced by virtual objects. A real object is termed also in part object to be tracked. Static objects are objects in particular which do not move relative to the camera stand foot. For example: a camera is mounted on a stand, the stand stands on the floor, then a house is static relative to the camera even if the camera is rotated or tilted, whereas a running person is dynamic.

With respect to an object, a different object is termed static if the spatial position of the objects in a given period of time does not change relative to each other, the converse is termed dynamic. Static scene components are hence one or more objects in the camera image which do not change their spatial position relative to a further object in a given period of time.

The method according to the invention and the device according to the invention are advantageously based on the fact that, irrespective of the sensor system used and the precision for the model resulting therefrom, it uses preferably all of the camera parameters detected there in order to obtain a rough location determination. The prescribed model need not then be expressed precisely. Rather, a separate model can be used, according to which objects can be placed precisely in the camera image. As a result, independence from the underlying model results and it can be combined with all other tracking systems. For this purpose, one or more known features of the real object to be tracked are sought in the camera image and set in relation to the delivered sensor values. These relations ("sensor value combinations"—"appearance of the features in the camera image") accumulate over time and hence ensure increasing precision. Failure of sensors, incomplete data, imprecisions, measuring errors or concealing of features in the camera image can advantageously be bridged by interpolation.

In addition, features of the scene which do not originate from the object to be tracked but allow location of the object (e.g. static scene components around a statically placed object) can be recorded jointly in the relation or stored in separate relations. The distortion of the features of the real object, produced by the camera perspective, can advantageously be transmitted to the graphics unit in order to place the replacement adequately. The placing is not necessarily effected thereby by 3-D rendering. In situations in which too few features in the camera image are visible, the precision depends upon the interpolation and underlying tracking system. Complex pre-measurements, for example of the real scene or of the lens properties, are dispensed with. The data stored in the assignment memory can optionally be used in addition for the purpose of calculating a 3D image of the scene recorded by the camera and/or also the position (x, y, z) of the recording camera with and without further assistance of sensors. In particular, the data of a plurality of cameras can advantageously be compared, relative to each other, for this purpose. The consequently obtained results can advantageously correspondingly assist determination of positions of mobile cameras.

It should be noted that the pixel-wise replacement of the object (keying) is not necessarily of concern hereby but merely finding its pixel-precise position, form and/or orientation (tracking).

Optional features of the method according to the invention can inter alia be the following:

1. Method for recognition and exact location of real objects in camera images and also their replacement by a subsequent graphic process:
   a. a camera tracking system for each image detecting all of the camera parameters which the camera movement covers completely (e.g. in the case of static cameras without position)
   b. the object comprising features (colour/form) which unequivocally identify it with its position and orientation in the camera image relative to the rest of the scene. (Features can be missing entirely or partially, be concealed, be distorted with respect to perspective etc. according to the image section)
   c. the graphic process being able to implement entirely and correctly replacement of the object in the image by means of the feature information.
2. Method based on number 1, image processing recognising the features of the object in the camera image.
3. Method based on numbers 1 and 2, the recognised features of the object, together with the camera tracking data, being stored as relation in a data bank-similar memory or relations present being subsequently improved.
4. Method based on numbers 1 and 2, also features which do not originate from the object itself being used in the form of completion or addition of relations.
5. Method based on numbers 1, 2 and 3 or 1, 2, 3 and 4, the memory being used with relations in order, by interpolation in images with incomplete, only partially present or entirely missing features, to implement an object recognition and positioning and to complete the features correspondingly.
6. Method based on numbers 1 or 1 and 2 or 1, 2, 3 and 5, the recognised features in a graphics system allowing an image replacement of the object which suits the current camera perspective and the appearance or form of the object.

7. Method based on number 1, the tracking comprising a camera sensor (mono/stereo)
8. Method based on number 1, the tracking comprising encoder-based sensors.
9. Method based on number 1, the tracking comprising sensors for torque, acceleration, impulse, magnetic field, gravitation, etc.
10. Method based on number 1, the tracking comprising wireless sensors (radar, GPS, laser, etc.).
11. Method based on number 1, the tracking comprising encoder-based sensors.
12. Method based on number 1, the tracking using processing of the camera image to express the calculation precisely.
13. Method based on number 1, the tracking comprising a combination of the mentioned sensors (hybrid tracking).
14. Method based on number 1, the object in the scene being rigid (no deformation).
15. Method based on number 1, the object in the scene not being moved.

AND/OR

16. Method for replacing a real object in a camera image by a virtual object with the following steps:
    determination of all camera parameters required for detecting a camera movement,
    detecting the position and orientation of a real object by detection of features of the real object or features with a relation to the real object, in particular colour and/or shape, the features of the real object or adjacent objects unequivocally identifying the real object relative to further objects in the camera image,
    forming and storing relations from the camera parameters or model parameters of a model derived from the camera parameters and also the detected position and orientation of the real object, expressing precisely the detected position and orientation of the real object by interpolation based on the stored relations,
    transforming a virtual object so that the position and orientation or the virtual object corresponds to the position and orientation of the real object,
    inserting the transformed virtual object into the camera image so that the virtual object replaces the real object in the camera image, extensively pixel-precisely.
17. Method according to the preceding numbers, characterised in that the relations are stored in a data bank.
18. Method according to one of the preceding method claims, characterised in that the missing features in the camera image and/or missing camera parameters are determined by interpolation from the stored relations.
19. Method according to one of the preceding numbers with respect to the method, characterised in that the camera parameters are determined from sensor data and/or from the camera image.
20. Method according to one of the preceding numbers with respect to the method, characterised in that the sensor data are generated by at least one force sensor, inertia sensor, monoimage sensor, stereoimage sensor, encoder-based sensor (optical, inductive, magnetic), radar sensor, GPS sensor and/or laser sensor or are generated by a combination of the listed sensors.
21. Device for replacing a real object in a camera image by a virtual object, having at least
    a camera for producing a camera image,
    a camera tracking system for detecting camera parameters,
    at least one image processing unit which is equipped to detect the position and orientation of the real object, the real object being identifiable by means of features in the camera image by the image processing unit,
    at least one memory which is equipped to store relations from the camera parameters or model parameters of a model derived from the camera parameters and also the position and orientation of the real object,
    at least one processor which is equipped to express the position and orientation of the real object precisely on the basis of the stored relations, to transform the virtual object such that it can replace the real object in the camera image extensively pixel-precisely and also for replacing the real object by the virtual object.
22. Device according to the preceding number, characterised in that the memory is a data bank or is organised similarly to a data bank.
23. Device according to one of the preceding numbers with respect to the device, characterised in that the camera tracking system determines the camera parameters from sensor data of at least one force sensor, inertia sensor, monoimage sensor, stereoimage sensor, encoder-based sensor (optical, inductive, magnetic), radar sensor. GPS sensor and/or laser sensor or a combination of these sensors.

Further optional embodiments of the invention can be configured as follows:
1. Method for replacing a real object in a camera image by a virtual object having the following steps:
    determining all the camera parameters required for detecting a camera movement,
    detecting the position and orientation of a real object in the camera image by detection of features of the real object or features with a relation to the real object, in particular colour and/or shape, the features of the real object or of adjacent objects unequivocally identifying the real object relative to further objects in the camera image,
    forming and storing relations from the camera parameters or model parameters of a model derived from the camera parameters and also from the detected position and orientation of the real object,
    expressing precisely the detected position and orientation of the real object by interpolation based on the stored relations,
    transforming a virtual object so that the position and orientation of the virtual object corresponds to the position and orientation of the real object,
    inserting the transformed virtual object in the camera image so that the virtual object replaces the real object in the camera image extensively pixel-precisely.
2. Method according to the preceding embodiment, characterised in that the relations are stored in a data bank.
3. Method according to one of the preceding embodiments, characterised in that the missing features in the camera image and/or missing camera parameters are determined by interpolation from the stored relations.

4. Method according to one of the preceding embodiments, characterised in that the camera parameters are determined from sensor data and/or from the camera image.

5. Method according to the preceding embodiment, characterised in that the sensor data are generated by at least one force sensor, inertia sensor, monoimage sensor, stereoimage sensor, encoder-based sensor (optical, inductive, magnetic), radar sensor, GPS sensor and/or laser sensor or by a combination of the listed sensors.

6. Device for replacing a real object in a camera image by a virtual object, having at least
   a camera for producing a camera image,
   a camera tracking system for detecting camera parameters,
   at least one image processing unit which is equipped to detect the position and orientation of the real object, the real object being identifiable by means of features in the camera image by the image processing unit,
   at least one memory which is equipped to store relations from the camera parameters or model parameters of a model derived from the camera parameters and also the position and orientation of the real object,
   at least one processor which is equipped to express precisely the position and orientation of the real object on the basis of the stored relations, to transform the virtual object such that it can replace the real object in the camera image extensively pixel-precisely and also for replacing the real object by the virtual object.

7. Device according to the preceding embodiment, characterised in that the memory is a data bank or is organised similarly to a data bank.

8. Device according to one of the preceding embodiments, characterised in that the camera tracking system determines the camera parameters from sensor data of at least one force sensor, inertia sensor, monoimage sensor, stereoimage sensor, encoder-based sensor (optical, inductive, magnetic), radar sensor, GPS sensor and/or laser sensor or a combination of these sensors.

In the following, the invention is intended to be explained by way of example, with reference to a Figure. The features described in the example can however be produced also independently of the illustrated example and the features in the example are essential only insofar as they have been described above as essential for the invention.

There are shown

Figure 2:
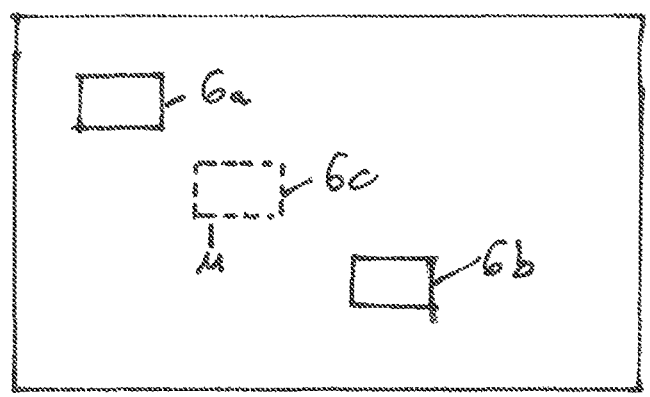
Figure 3:
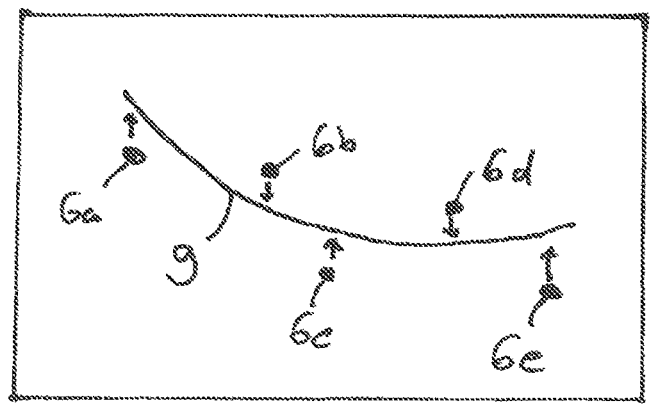
Figure 4:
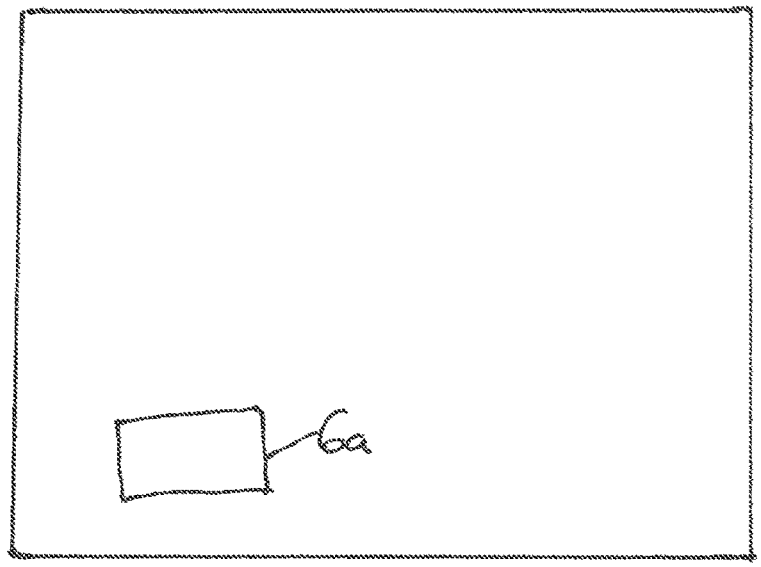
Figure 4:
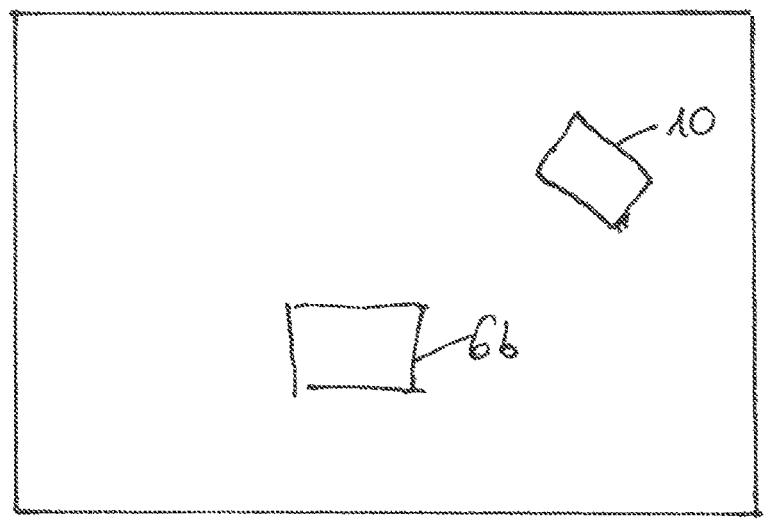
Figure 4:
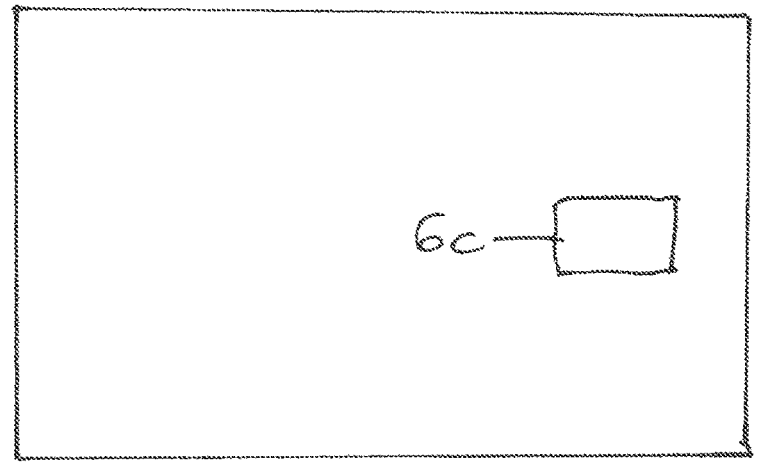

FIG. 1 shows an embodiment by way of example of the method according to the invention, FIG. 2 an example of an interpolation of recognised positions, FIG. 3 an example of smoothing of recognised positions and FIG. 4 an example of a plausibility check for recognising incorrectly recognised features.

FIG. 1 shows an embodiment, given by way of example, of the invention. Partial Figure A thereby shows schematically a construction for implementing the method according to the invention, partial Figure B shows three frames of a moving image recorded by the camera and partial Figure C shows a schematic flow chart of the method according to the invention.

FIG. 1A shows schematically a construction with which the method according to the invention is implementable. The system comprises a camera 1 and an evaluation unit 2. The camera 1 has one or more sensors 3a and 3b with which one or more properties of a state of the camera 1 can be determined.

The camera 1 has a lens 5 with which it records a section of a scene 4. In the scene 4, at least one object 6 is present, which is present at least at times and at least partially in the section of the scene 4 recorded by the camera 1.

FIG. 1B shows, by way of example, three sections 7a, 7b and 7c during a pan over the scene 4. The camera is thereby pivoted horizontally from section 7a to section 7b and tilted from section 7b to section 7c. It can be detected that the object 6 is present in the three sections 7a, 7b and 7c in different positions and different orientations.

FIG. 1C shows schematically an implementation of the method according to the invention. In a step S1, features of the object 6 are recognised and, in a step S2, positions of the recognised features of the object 6 are assigned to values of properties of the camera state which were determined by means of the sensors 3a and 3b and stored in an assignment memory 8. In a tracking step S3, positions of features of the object 6 can be read out of the assignment memory 8 by means of values of properties of the camera state which are determined by the sensors 3a and 3b.

FIG. 2 shows, by way of example, how further positions 6c of the at least one feature of the object can be determined for further values of the at least one property of the camera state from two assignments, stored in the calibration step in the assignment memory, of values of the at least one property of the camera state at positions 6a and 6b of the at least one feature of the object 6. At least two positions 6a and 6b which are assigned to values of the property which are next to the corresponding further value are thereby interpolated and/or extrapolated so that at least one further position 6c is calculated. The position 6c determined by means of interpolation or extrapolation can be marked as calculated with a marker M.

If now the camera 1 adopts a state in which the sensors provide values in the case of which the object 6 is stored in a position 6a, 6b or 6c in the assignment memory, then the determined position of the object 6 can be further increased if, in an image processing step, the actual position 6a, 6b or 6c of the feature of the object 6 is determined. In particular if position 6c is marked as calculated, it is advantageous if the actual position determined by the image processing in the assignment memory 8 replaces the calculated position 6c.

FIG. 3 shows, by way of example, how positions 6a to 6e, stored in the assignment memory, of the at least one feature of the object 6 can be smoothed. For the sake of simplicity, here the determined positions 6a to 6e are represented merely as dots. Smoothing can be effected for example by a constantly differentiable function 9 being fitted at the stored positions 6a to 6e and then the stored positions 6a to 6e being displaced towards the fitted function. The smoothing can also be effected by the positions being respectively displaced towards a mean of a prescribed number in both directions relative to the corresponding position of adjacent positions.

As shown analogously to FIG. 3, smoothing can also be effected temporally. In this case, the illustrated positions 6a to 6e represent temporally successively determined positions. If it is assumed that the camera pans along a smooth path, then the deviations of the positions 6a to 6e from a constantly differentiable curve can be identified as noise. By means of smoothing, this error can be compensated for.

FIG. 4 shows, by way of example, how incorrect recognitions 10 of the at least one feature of the object 6 can be recognised. Three sections recorded by the camera are shown. Since the camera pans over the scene, the object moves from a position 6a to a position 6b and then to a position 6c. This movement is prescribed by the physical properties of the camera. In the central section, an object 10 is now recognised incorrectly.

Since this cannot however be the object 6 on the basis of the physical properties of the camera construction, since it is too far removed from the latter, the recognition 10 can be rejected as incorrect.

The sensors 3a and 3b can determine for example one or more properties of the camera state, selected from the group comprising swivel (pan), inclination (tilt), lateral tilting (roll), zoom, focus, lens distortion, depth of field, offset of the optical axis relative to a last nodal point and/or offset of the optical axis relative to a camera image sensor. Preferably, these sensors are mechanical sensors or electromechanical sensors.

The invention claimed is:

1. A method for tracking at least one object in a moving image signal recorded by a camera, the camera recording sections of a scene, in which sections the object is present at least at times and at least partially, and the camera producing the moving image signal as image of the recorded sections, values of at least one property of a camera state being determined with at least one sensor,
   wherein in a calibration step, determining in the moving image signal positions of at least one feature of the object for a large number of the values of the at least one property of the camera state, and
   storing these positions, assigned to those values of the property of the camera state for which these positions were determined in an assignment memory,
   wherein in a tracking step, determining at least one value of the at least one property of the camera state using the at least one sensor, and that position which is stored assigned to this value is read out of the assignment memory as position of the at least one feature of the object.

2. The method according to claim 1,
   from at least some of the assignments of values of the at least one property of the camera state to positions of the at least one feature of the object, stored in the assignment memory in the calibration step, further positions of the at least one feature of the object for further values of the at least one property of the camera state are determined,
   by at least two positions which are assigned preferably to values of the property which are next to the corresponding further value being interpolated and/or extrapolated.

3. The method according to claim 2, those positions which were determined by interpolation or extrapolation being marked as calculated in the assignment memory.

4. The method according to claim 1,
   the position, read out in the tracking step, of the at least one feature of the object being used as start position for a search for the feature of the object in an image processing step and an actual position of the feature being determined in the image processing step,
   the actual position, determined in the image processing step, being stored in the assignment memory as that position which is assigned to that value of the property of the camera state to which the position read out in the tracking step was assigned.

5. The method according to claim 1, the positions, stored in the assignment memory, of the at least one feature of the at least one object being smoothed.

6. The method according to claim 5, the smoothing being effected by a constantly differentiable function being fitted to the stored positions and then the stored positions being displaced towards the fitted function and/or smoothing being effected by the positions being displaced respectively towards a mean of a prescribed number of in both directions relative to the corresponding position adjacent positions.

7. The method according to claim 1, incorrect recognitions of the at least one feature of the object being determined by a plurality of positions of the feature being compared at different values of the property of the camera state and those positions which are not possible because of the physical properties of the camera being determined as incorrect.

8. The method according to claim 1, further positions of the at least one feature of the object being determined by a temporal course of the position of the feature being extrapolated.

9. The method according to claim 1, a temporal course of the positions of the feature of the object being checked with respect to whether this course is physically possible and, in the case where the course is not physically possible, the positions which are not physically possible being characterized as incorrect and/or being rejected.

10. The method according to claim 1, the positions of the feature being displaced such that the temporal course of the positions is smoothed.

11. The method according to claim 1, the properties of the camera state being one or more selected from the group comprising swivel, pan, inclination, tilt, lateral tilting, roll, zoom, focus, lens distortion, depth of field, offset of the optical axis relative to a last nodal point, offset of the optical axis relative to a camera image sensor and/or one, two or three coordinates of the location of the camera in space.

12. The method according to claim 1, the features of the object comprising or being edges of the object, surfaces of the object and/or regions of the object with a prescribed colour or a combination of a plurality of these features.

13. The method according to claim 1, the position of other features of the object being derived from knowledge of the position of the features relative to each other in the object.

14. The method according to claim 1, the sensors being mechanical sensors.

15. The method of claim 1, comprising replacing at least one object by at least one virtual object in a moving image signal recorded by a camera,
   the object being tracked and wherein by position, read out of the assignment memory of the at least one feature it is determined, in which region of the moving image the at least one object is present and that region of the moving image in which the object is present being replaced by a representation of the virtual object.

16. The method of claim 1, performed using an image processing device having at least one camera and at least one computing unit.

17. A method for tracking at least one object in a moving image signal recorded by a camera, the camera recording sections of a scene, in which sections the object is present at least at times and at least partially, and the camera producing the moving image signal as image of the recorded sections, values of at least one property of a camera state being determined with at least one sensor,
   wherein in a calibration step, determining in the moving image signal positions of at least one feature of the object for a large number of the values of the at least one property of the camera state, and storing these positions, assigned to those values of the property of the camera state for which these positions were determined in an assignment memory, wherein in a tracking step, determining at least one value of the at least one property of the camera state using the at least one sensor, and that position which is stored assigned to this value is read out of the assignment memory as position of the at least one feature of the object;

the position, read out in the tracking step, of the at least one feature of the object being used as start position for a search for the feature of the object in an image processing step and an actual position of the feature being determined in the image processing step, the actual position, determined in the image processing step, being stored in the assignment memory as that position which is assigned to that value of the property of the camera state to which the position read out in the tracking step was assigned, the actual position determined in the image processing step only then being stored in the assignment memory as that position which is assigned to that value of the property of the camera state to which the position read out in the tracking step was assigned if the position read out in the tracking step was a calculated position.

* * * * *